United States Patent
DeRoy et al.

(10) Patent No.: US 8,527,401 B2
(45) Date of Patent: Sep. 3, 2013

(54) PRODUCT, SYSTEM AND METHOD FOR CERTIFICATION OF CLOSING AND MORTGAGE LOAN FULFILLMENT

(75) Inventors: Craig I. DeRoy, Rolling Hills Estates, CA (US); Jim Dufficy, Coto De Caza, CA (US); Kathleen Collins, Long Beach, CA (US); Roger S. Hull, Tustin, CA (US); Ravi Ramanathan, Irvine, CA (US)

(73) Assignee: The First American Corporation, Santa Ana, CA (US)

( * ) Notice: Subject to any disclaimer, the term of this patent is extended or adjusted under 35 U.S.C. 154(b) by 1187 days.

(21) Appl. No.: 11/256,837

(22) Filed: Oct. 24, 2005

(65) Prior Publication Data

US 2006/0136330 A1 Jun. 22, 2006

Related U.S. Application Data (60) Provisional application No. 60/621,401, filed on Oct. 22, 2004.

(51) Int. Cl.
 *G06Q 40/00* (2012.01)
(52) U.S. Cl.
 USPC .............................................. 705/38; 705/35
(58) Field of Classification Search
 USPC .................................................... 705/38, 35
 See application file for complete search history.

(56) References Cited

U.S. PATENT DOCUMENTS

| | | | |
|---|---|---|---|
| 5,699,527 A | 12/1997 | Davidson | |
| 5,870,721 A | 2/1999 | Norris | |
| 6,029,149 A | 2/2000 | Dykstra et al. | |
| 6,236,973 B1 | 5/2001 | Dillard | |
| 6,366,892 B1 | 4/2002 | Altman et al. | |
| 6,438,526 B1 | 8/2002 | Dykes et al. | |
| 6,611,816 B2 | 8/2003 | Lebda et al. | |
| 7,107,241 B1 * | 9/2006 | Pinto | 705/38 |
| 2001/0047326 A1 | 11/2001 | Broadbent et al. | |
| 2002/0059137 A1 * | 5/2002 | Freeman et al. | 705/38 |
| 2003/0093366 A1 * | 5/2003 | Halper et al. | 705/38 |
| 2003/0229581 A1 | 12/2003 | Green et al. | |
| 2004/0019544 A1 | 1/2004 | Yaruss | |
| 2004/0078318 A1 | 4/2004 | Miller | |
| 2004/0078323 A1 | 4/2004 | Johnson et al. | |
| 2004/0230510 A1 * | 11/2004 | Tyson-Quah | 705/35 |

OTHER PUBLICATIONS

National_Mortgage_News; "Lexign Heads Toward All-Electronic Mortgage with Its First Product"; Dec. 10, 2001; ISSN: 1050-3331.*

(Continued)

*Primary Examiner* — Edward Chang (74) *Attorney, Agent, or Firm* — R. Blake Johnston, Esq.; DLA Piper LLP US (57) ABSTRACT

A computer system and method for processing a mortgage loan receives borrower, property, loan and underwriting data entered by a lender via a certifying company Internet web site. The system, which is operated by the certifying company, communicates with outside service provider systems to order and obtain products there from. The system is loaded with lender parameters for assessing loan risk. The system uses the entered data, outside service provider products and lender parameters to provide a loan assessment and a mortgage loan fulfillment product if the assessment is favorable. The mortgage loan fulfillment product includes a loan package, deed of trust, a promissory note, a title insurance policy and a loan fulfillment certification of the process compliance and data integrity.

10 Claims, 7 Drawing Sheets

(56) References Cited

OTHER PUBLICATIONS

Reilly, Linda; "Advice to a new manager of an existing revolving loan fund"; Summer 1994; Economic Development Review; ISSN: 0742-3713.*

Business_wire; "TransUnion Expedites the Loan Closing Process with Alternative Title Assurance Offering"; Sep. 30, 2004; Supplier No. 122727584.*

* cited by examiner

PRODUCT, SYSTEM AND METHOD FOR CERTIFICATION OF CLOSING AND MORTGAGE LOAN FULFILLMENT

CLAIM OF PRIORITY

This application claims priority from U.S. Provisional Patent Application Ser. No. 60/621,401, filed Oct. 22, 2004.

BACKGROUND OF THE INVENTION

The present invention generally relates to real estate mortgages and, more specifically, to a product, system and method for providing an integrated data gathering, loan processing and closing service. All data gathered using the method of the present invention is closely controlled and the method results in a closed mortgage loan transaction which is protected by a consolidated certification of the loan process.

Figure 1:
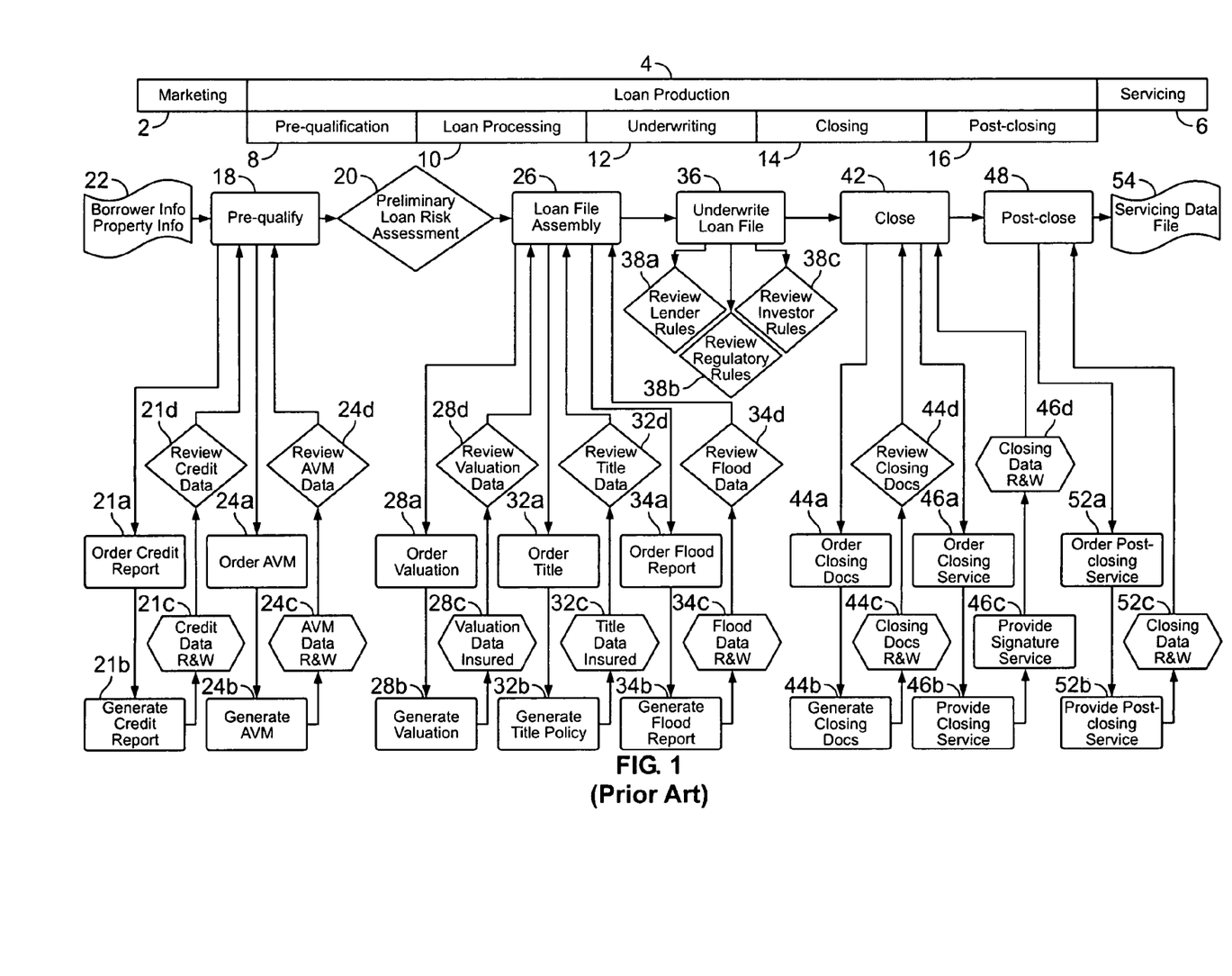
FIG. 1 is a flow chart of a prior art loan processing process.

As illustrated in FIG. 1, the traditional, prior art mortgage process includes the following three main stages: Marketing 2, Loan Production 4 and Servicing 6.

The Marketing stage 2 consists of a variety of activities that focus on acquiring new customer business. Methods of traditional marketing include direct contact with real estate agents and other potential advisors who can direct a buyer to a specific lender as well as direct to customer strategies including postal mail campaigns, web advertisement and mixed-media commercials.

The Servicing stage 6 consists of collecting monthly mortgage principal and interest payments from homeowners, managing escrow accounts for paying taxes and homeowners' insurance premiums, overseeing foreclosure and loss mitigation procedures when borrower's are unable or unwilling to repay as well as remitting principal and interest payments to secondary market investors or security holders.

The present invention primarily relates to the Loan Production stage 4. The objectives of the Loan Production stage 4 are to qualify a customer for a loan program, collect all necessary information with regard to the proposed loan, assess the lender's risk relative to the loan and finally close the loan. As illustrated in FIG. 1, the Loan Production stage includes the Pre-Qualification phase 8, Loan Processing phase 10, the Underwriting phase 12, the Closing phase 14 and Post Closing phase 16.

Prior to moving to the Loan Processing phase, a potential borrower is typically "pre-qualified" by the lender. The Pre-Qualification process step 18 consists of a brief and typically automated review of credit information, data provided by the potential borrower via an application form (including information related to income, debt and assets), the purpose of the mortgage and the value of the subject property (that serves as the collateral for the loan).

During the Pre-Qualification process step, a credit report, as indicated at 21a, is typically ordered from a settlement services provider. The settlement services provider generates the credit report 21b and provides representations and warrants 21c for the credit data in the report. In addition, borrower information and information on the subject property (such as the property address, etc.) is provided at 22. The property information is used to order an Automated Valuation Model ("AVM") valuation of the subject property, as indicated by blocks 24a and 24b. As illustrated at 24c, representations and warrants are also provided by the AVM service provider for the data in the AVM report. The data of the credit and AVM reports is then reviewed, as indicated by blocks 21d and 24d by the lender.

The Preliminary Loan Risk Assessment 20 is then performed by the lender evaluating the credit score of the borrower, payment history, outstanding debts, liquid and non-liquid assets as well as assumed subject property value. If the risk level of the loan is acceptable to the lender, the loan progresses to the Loan Processing phase 10.

The Loan Processing phase 10 primarily entails verifying employment, income, asset, debt and other information provided by the borrower, and ordering of settlement products including, but not limited to, flood determination and insurance products, appraisal, and title information for the subject property.

During the Loan File Assembly process step 26, the loan package is assembled for underwriting review and determination. As part of the assembly, an appraisal or valuation of the subject property is ordered 28a, generated 28b and insured by the valuation service provider 28c. Finally, the valuation data is reviewed 28d before being added to the loan file by the lender. A title search and flood report (also for the collateral/subject property) are also ordered, generated, insured (by the responsible service provider) and reviewed as indicated at 32a-32d and 34a-34d, respectively, before being added to the loan file by the lender.

The required loan package documentation is determined by loan program, investor and regulatory guidelines. The documentation collected consists of information that substantiates the borrower's willingness and ability to repay the obligation and identifies any potential risk in the collateral/subject property securing the loan. The documentation that has been collected up to this point is critical to the salability of the loan to an investor as well as to validate the viability of the loan. Any significant defects in the loan documentation may prohibit an investor from purchasing the loan from the originating lender or result in the repurchase of the loan by the originating lender in the event that the borrower fails to repay the obligation.

The objective of the Underwriting phase 12 is to make a final assessment in respect to the credit and collateral risk of the proposed loan. During the Underwrite Loan file step 36, an underwriter and/or automated underwriting system will review pertinent borrower and collateral/subject property information, using lender rules 38a, regulatory rules 38b and investor rules 38c, and provide the appropriate underwriting determination.

The outcome of the underwriting review typically results in the following determinations: Approved, Approved with Conditions or Declined. When loans are approved with conditions, the verification process will usually continue with the understanding that further supporting documentation is required prior to closing the loan or, in some cases, before the underwriter is willing to approve the loan for closing. In many cases, a declination will result in changing loan parameters (e.g. loan program, perhaps an adjustable rate mortgage with a low initial interest rate, down payment amount, obtaining gift funds, combining a first and second mortgage, etc.), which may allow the borrower to qualify.

Upon approval, additional documentation may be collected during the Underwriting phase 12 to fulfill certain underwriting requirements or stipulations as well as other documentation such as proof of property and casualty insurance on the subject property which may be required prior to closing and funding the mortgage loan.

During Close step 42 of the Closing phase 14, an integrated package of loan processing and document delivery systems will prepare the necessary legal and disclosure documents to be available for the closing of the real estate transaction. More specifically, the closing documents will be ordered 44a and generated 44b. Representations and warrants will be provided for the closing documents, as indicated by 44c, by the service provider and the closing documents are reviewed by the lender 44d.

During the Close step 42 of the Closing phase 14, the closing service is ordered 46a. The closing service 46b and signature service 46c essentially coordinate the execution of the loan agreement, provide the borrower(s) with required disclosure information and manage the collection and disbursement of funds to all of the parties involved in the loan transaction. The coordination of involved parties may include a real estate seller, real estate agents, third party service providers, local government agencies, lien holders and lenders. The closing agent will also ensure that any title issues are resolved prior to the closing of the loan to ensure the appropriate lien position of the loan. As such, the closing agent also provides representations and warrants, as indicated at 46d.

The Post-Closing phase 16 includes the Post-Close step 48 during which the post-closing service is ordered 52a and provided 52b by a post-closing service provider. During this step, the loan is prepared for the investor and loan servicer. This phase also reviews the loan to ensure that appropriate investor and regulatory guidelines were met and the loan package is salable in the secondary market. The post-closing service provider therefore provides representations and warrants as indicated at 52c. The final contract documents ultimately are housed in a servicing data file 54 for access at a later period in time.

As is clear from the above, the following attributes characterize the traditional, prior art mortgage process of FIG. 1: misalignment of incentives, fragmented data acquisition, fragmented decisioning, fragmented insurance/assurance and asynchronous quality control.

Misalignment of incentives permeates the entire prior art loan production process. Loan officers, real estate agents, loan processors, appraisers and various third party providers are under extreme pressure to complete each and every transaction. This pressure is exacerbated by the previously described process fragmentation and complexity resulting in a high frequency of misrepresentation or in some cases fraudulent activity. The traditional process, relying on multiple data providers with varying degrees of pressure to "perform" from the perspective of the lender leads to significant opportunity and motivation on the part of these providers to misrepresent information and possibly engage in fraud. In addition, fragmentation also allows well organized groups to design and execute complex, well-designed schemes that exploit these weaknesses.

Fragmented data acquisition is an attribute of the mortgage process of FIG. 1 in that the current risk assessment, data acquisition and service product ordering process is distributed throughout the loan origination lifecycle and is dependent upon multiple sources (service providers) which may or may not be completely trusted. Loan prequalification products are typically ordered at the point-of-sale with other products, such as flood, appraisal, title and closing, that are ordered during the loan processing phase. Further products are also ordered during the closing phase, such as document preparation services and signing services. This fragmented acquisition and ordering process adds time and cost to the process as well as making it very difficult for a lender to manage vendor performance, data accuracy or maximize process efficiencies and product cost.

Fragmented decisioning also occurs in the mortgage process of FIG. 1 in that the process requires a variety of critical decisions to be made throughout the loan origination lifecycle based on limited data sets. A pre-qualification decision is made at the point-of-sale with just the credit data. A decision is made on the risk associated with the collateral value with just the appraisal/automated valuation model ("AVM") at a different point in time. Similar fragmented decisions are made essentially every step of the process. Not only is the process inherently inefficient from a time/cost perspective but the decisions are sub-optimal as they are not based on the complete data set and an understanding of the interplays between various data items.

Fragmented insurance/assurance occurs in the mortgage process of FIG. 1 in that investors typically require a variety of assurance and insurance agreements for various aspects of the loan transaction. All of the assurance and insurance components are managed separately with separate coverage boundaries, representations and warrants. Examples include: title insurance, mortgage insurance, hazard insurance, collateral valuation insurance and assurances, document preparation assurances, closing assurances, credit data assurances, flood data assurances and tax data assurances. This does not allow the lender to have a single vendor for accountability when issues arise around a loan and makes it difficult to optimize the insurance/assurance coverage to the real risk. The investor relies upon the lender to provide the primary representations and warrants with the lender subordinating these risks in this fragmented design.

Asynchronous quality control exists in the mortgage process of FIG. 1 in that quality control activities typically occur post-closing and/or just prior to funding. In most cases pre-funding quality control activities only occur on a minority of loans. Not only does this result in an inefficient process but also results in erroneous closings with potentially increased losses to the lender.

Accordingly, it is an object of the present invention to provide a new consolidated product, method and system for certifying the closing and mortgage loan fulfillment.

It is another object of the present invention to provide a closing and mortgage loan fulfillment certification product, method and system that eliminates fragmented data acquisition.

It is another object of the present invention to provide a closing and mortgage loan fulfillment certification product, method and system that eliminates fragmented decisioning.

It is another object of the present invention to provide a closing and mortgage loan fulfillment certification product, method and system that eliminates fragmented insurance/assurance.

It is still another object of the present invention to provide a closing and mortgage loan fulfillment certification product, method and system that controls the data utilized in the mortgage loan production process.

It is still another object of the present invention to provide a closing and mortgage loan fulfillment certification product, method and system that integrates data integrity procedures eliminating asynchronous quality control.

It is still another object of the present invention to provide a closing and mortgage loan fulfillment certification product, method and system that significantly diminishes or eliminates the opportunity for misrepresentation and fraud.

These and other objects and advantages will be apparent from the following specification.

SUMMARY OF THE INVENTION

The present invention is a combined system, methodology and certification product assuring accuracy, completeness and validity in the mortgage loan closing process. The system, method and product of the present invention assures completeness, validity, accuracy and efficacy of data utilized in reaching the decision to extend credit secured by a real estate mortgage. The method provides for complete control of data utilized in the loan production process virtually eliminating many of the risks involved in the traditional mortgage loan process.

In accordance with the present invention, a lender or originator of a loan provides a certifying company with data related to a potential mortgage loan transaction. This data includes, among other elements, borrower identification and financial information, including income, assets and debts, to consider in the credit decision and information defining the collateral property intended to secure the mortgage. The pertinent information is provided to the certifying company via electronic means either directly from the lender or through various intermediaries including real estate agents, loan brokers, financial planners or other interested parties.

Upon receipt of the information (the accuracy of which the borrower is required to certify) the certifying company employs software, rules and processes to acquire, verify and document all necessary data required to evaluate credit worthiness and collateral sufficiency for the subject borrower and subject real property for a specified loan program. In addition to collecting and verifying data, the methodology and software employ rules based upon lender guidelines to assure that the subject transaction meets the overall requirements for the given loan program or product. Alternately, the method, through software, determines the appropriate loan program for the borrower based upon criteria and parameters provided by the lender.

The resulting data set is either returned to the lender to render a credit decision or the certifying company integrates proprietary or third party automated or manual decision-making processes on behalf of the lender to arrive at a credit decision. Upon receipt of a positive credit decision, the methodology further employs a process and access to trusted sources of data to prepare loan documentation and close the transaction.

As the certifying company is in complete control of all data collected throughout the process, it is in the unique position to certify the accuracy and completeness of the data utilized in rendering the credit decision and preparing the transaction documents.

Following the closing and funding of the transaction, the certifying company delivers to the lender all necessary data and/or documentation to enable the lender to deliver the loan to the secondary market while providing an "electron vault" for the data and documentation gathered throughout the process, thus replacing the lender's traditional paper file.

The method uniquely provides, as part of the delivery to the lender, a loan fulfillment certification or certificate of indemnity assuring the lender and the secondary market that the data utilized in origination of the loan is accurate and that the loan was originated in compliance with lenders' criteria and certain regulatory and industry standards.

In addition to the certificate of indemnity, the system, method and product of the present invention provide additional risk amelioration through the assumption of certain representations and warranties traditionally provided to the secondary market on behalf of the lender.

The indemnity provided by the certifying company on the behalf of the lender endures through the life of the subject mortgage loan.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 2:
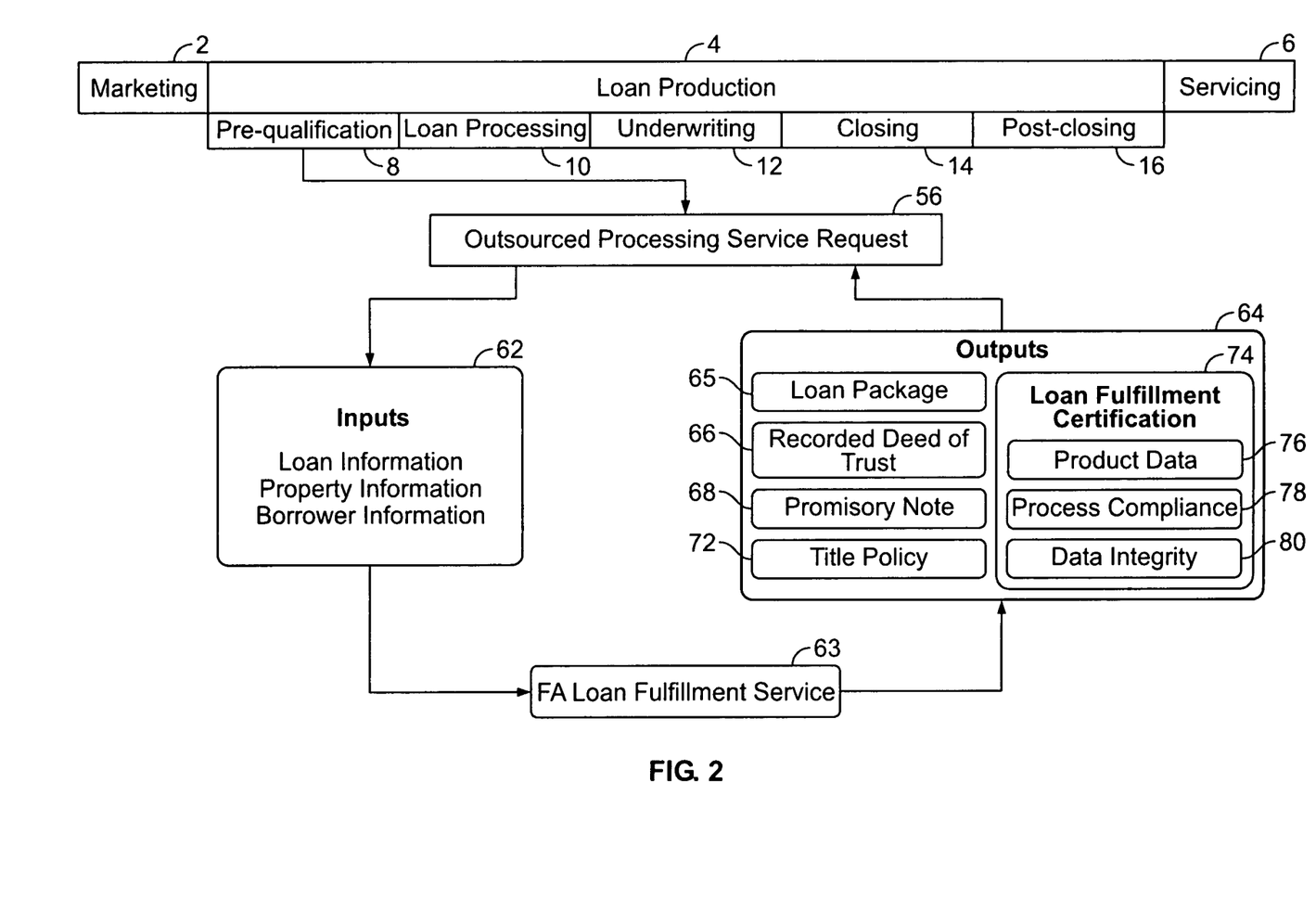
FIG. 2 is a high-level flow chart showing the inputs and output of an embodiment of the system and method of the present invention.

The inputs and outputs of an embodiment of the system and method of the present invention is provided by the high-level flow chart of FIG. 2. The stages and phases of the traditional, prior art mortgage loan process from FIG. 1 are included in FIG. 2 for comparison. In accordance with FIG. 2, a lender makes a single Outsourced Processing Service Request 56 to a single certifying company instead of having to perform the Pre-Qualification 8, Loan Processing 10, Underwriting 12, Closing 14 and Post-closing 16 phases of the Loan Production stage 4 of the prior art process.

As indicated at 62 in FIG. 2, in making the service request 56, the lender provides borrower information, including name and social security number, property information, including the collateral or subject property address (which may or may not be the same as the property being purchased) and loan information/requirements as inputs to the certifying company system 63. The certifying company, who owns and operates the system 63, provides the lender with outputs 64, which include, as will be explained in greater detail below, a loan package 65, a recorded deed of trust 66, a promissory note 68 a title insurance policy 72 and a loan fulfillment certification 74 of the product data 76, process compliance 78 and data integrity 80.

Figure 3:
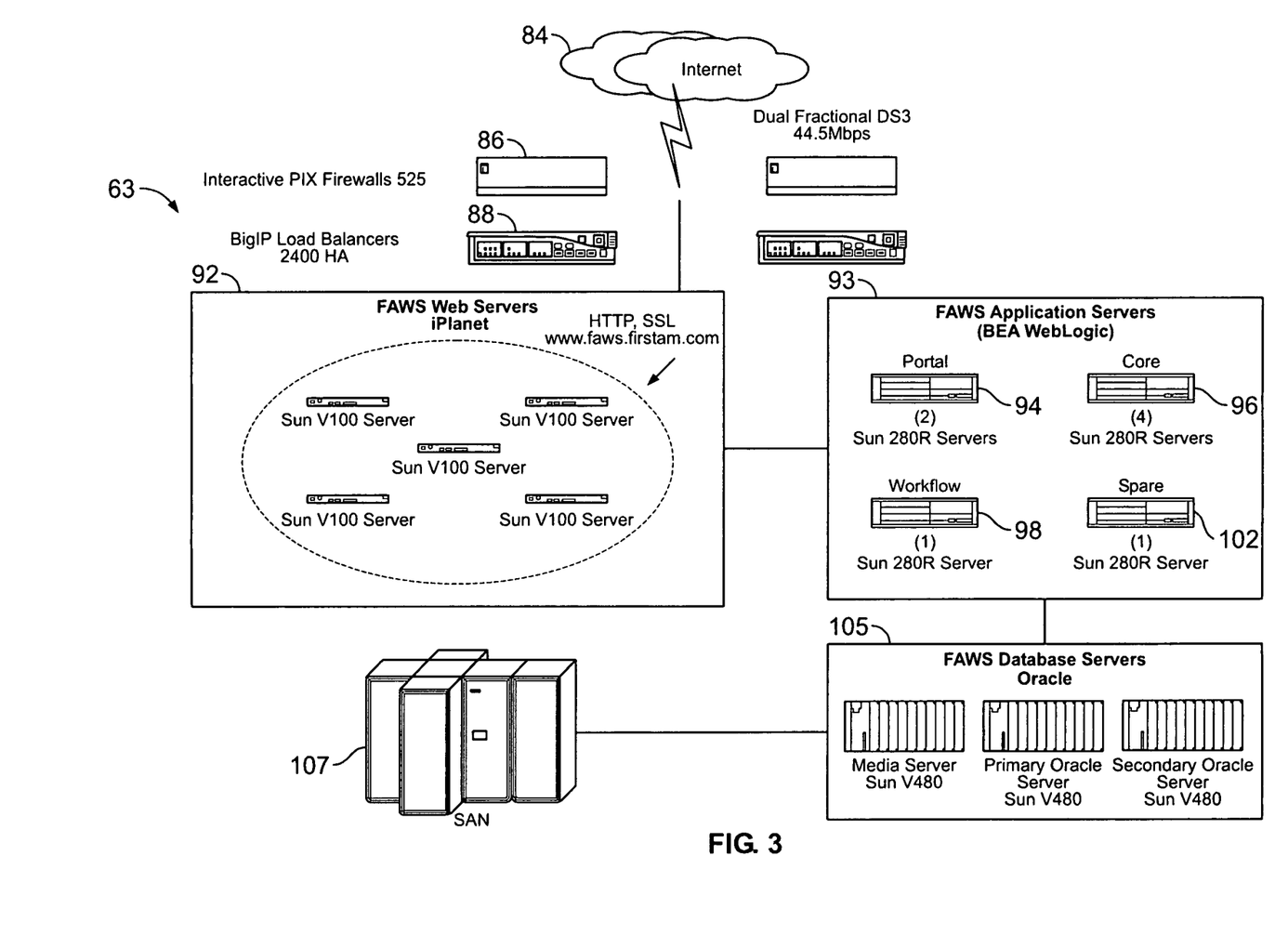
FIG. 3 is a schematic of a the hardware configuration and components of an embodiment of the system of the present invention.

FIG. 3 shows the hardware configuration and components of an embodiment of the certifying company system, indicated in general at 63. Lenders and other users access the system, which is at the certifying company's site, from remote locations through the Internet 84, firewalls 86, load balancers 88 and web servers 92, as is known in the art. User access is restricted to the web servers 92, which communicate with application servers 93. The application servers include one or more portal server(s) 94, core server(s) 96, workflow server(s) 98 and spare server(s) 102. As will be explained in greater detail below, the web servers 92 provide web page content that is published by the portal servers 94.

Figure 4:
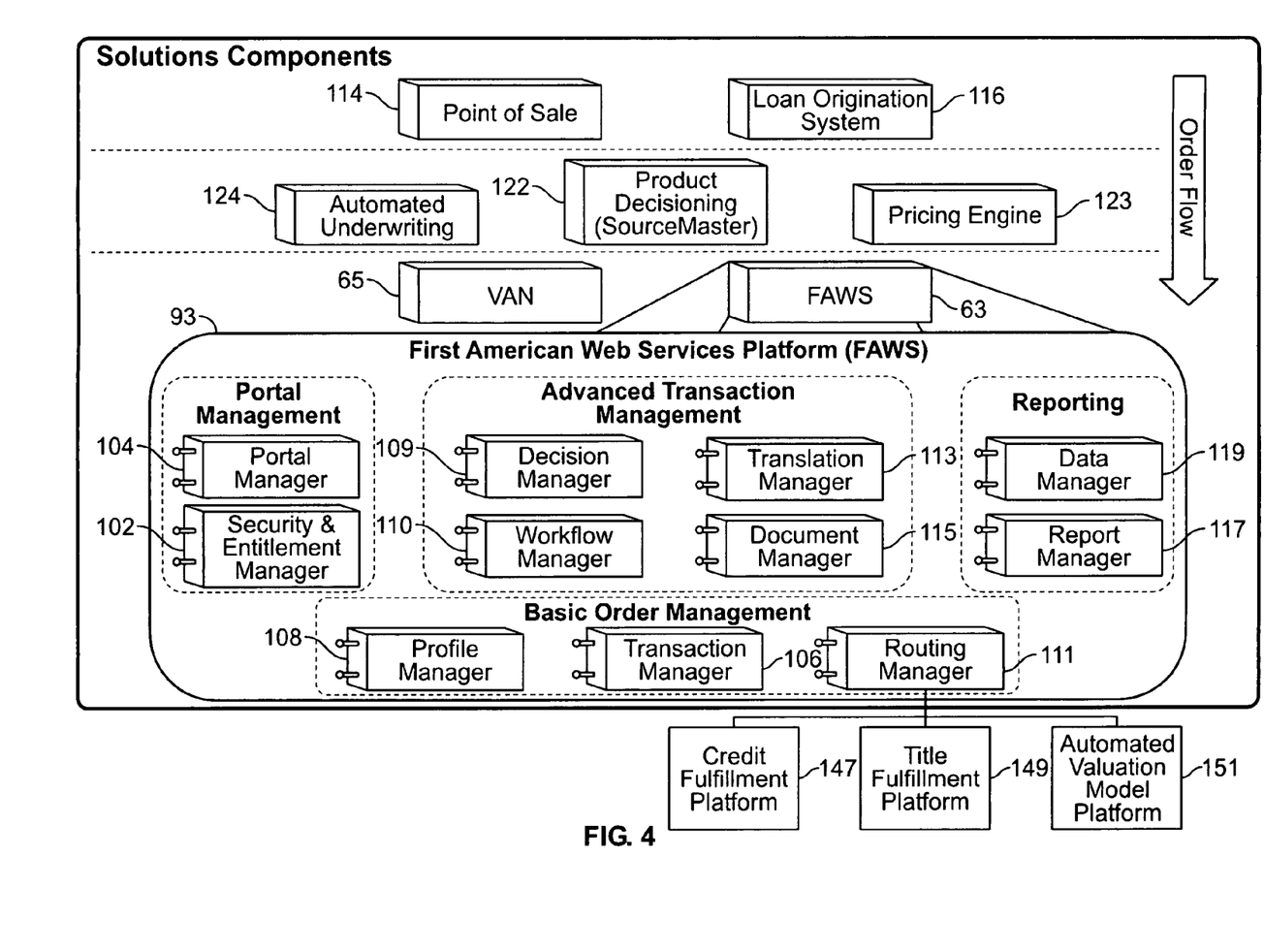
FIG. 4 is a schematic of the software modules of the system of FIG. 3 and typical lender systems and third-party platforms that interact with the system of FIG. 3.

The software modules of the application servers 93 are illustrated in FIG. 4. The portal servers 94 of FIG. 3 house the portal manager module 104 of FIG. 4 which is responsible for assembling data into web page content and packaging it into HTML streams to provide to the web servers 92 for delivery to the Internet 84. The web page content may then viewed at the certifying company's Internet web site by users of the system through the Internet 84. The portal manager provides the certifying company's Internet web site with portals which are in effect different views into the overall loan transaction data set. As a result, lenders or other users of the system may track the status of the transaction through the certifying company's web site. The portal manager also allows lenders or other users to customize the look and feel of the system web pages that they view based on their personal preferences to customize their system interaction.

The portal servers 94 of FIG. 3 interface with the core servers 96 to store and receive data. The core servers are the only servers that communicate with the system database servers 105, which preferably run ORACLE databases, for both storing and retrieving data. The system databases preferably are provided with redundant disk data storage via storage area network 107 (FIG. 3). The database servers 105 store and are the primary source for the system for all transaction data related to property, loan and borrowers. The data from each of the settlement service products ordered during the transaction lifecycle is also stored on the databases 105 along with the most current status of the transaction. In addition, the databases 105 store client configuration, pricing and other setup information.

The core servers 96 of FIG. 3 house, with reference to FIG. 4, the transaction manager 106, profile manager 108, security & entitlement manager 112, decision manager 109, routing manager 111, translation manager 113, document manager 115, report manager 117 and data manager 119 modules.

The transaction manager 106, profile manager 108 and routing manager 111 modules of FIG. 4 handle the basic order management of the system. More specifically, as will be explained in greater detail below, the system and method of the present invention orders various reports and products from outside service providers. These three modules handle data related to the order and receipt of such products.

The transaction manager module 106 of FIG. 4 provides a robust component that ties together the property, loan and escrow portions of a transaction to provide a cross-market or complete view of the transaction to lenders and other users of the system (such as borrowers and service providers). As will be explained in greater detail below, this view is provided via the web servers 92 (FIG. 3) and the certifying company Internet web site. The same transactional data can also be provided via XML to an external client system.

The profile manager module 108 of FIG. 4 is responsible for storing and managing system user preferences regarding the system displays and storing and managing settlement service product catalogs. The settlement service product catalogs provide a comprehensive list of all offerings available to a lender or other user via the system.

The routing manager module 111 of FIG. 4 provides bi-directional connectivity between lenders and outside service providers via the certifying company system. The key function of the routing manager is to provide a centralized system whereby all the business entities involved can place their requests and receive status information and services around a specific transaction. As an example, FIG. 4 illustrates the routing manager 111 connecting to the credit, title and automated valuation model product fulfillment platforms, 147, 149 and 151, respectively.

The security & entitlement manager module 112 of FIG. 4 works with the portal manager module 104 housed on the portal servers to provide portal management for the system, that is, management of the portals or data views that are available via the certifying company's Internet web site. The security & entitlement manager module is responsible for managing access to the system via the Internet. This module maintains the access rights to the overall loan transaction information set created by the system and method of the present invention. The access to the system is protected and restricted by a password-based login. All data interactions between the user and system preferably are encrypted via Secure Socket Layer (SSL) technology.

More advanced system transactions are managed by the decision manager module 109, workflow manager module 110, translation module 113 and document manager 115.

The decision manager module 109 of FIG. 4 leverages a flexible rules engine to capture and store the business logic underpinning decisions. The rules for making the decisions are independently created and stored by the lender. The module also allows for the storage of business logic as a combination of a set of decisions and the capability to leverage any data associated in the electronic file created during the method of the present invention. The rules may be as simple as data driven settlement service product selection or as complex as evaluating asset risk based on settlement service product data.

The translation manager module 113 of FIG. 4 supports data translation utilities between lender and outside service provider data formats. To accomplish this, the module uses data dictionaries across all portals, XML DTDs and commonly used data format translations (e.g. MISMO, CSV, etc.).

The document manager module 115 of FIG. 4 provides central storage, management and creation of documents of all types that are used in the transaction. It also provides a framework for disparate systems to exchange data/documents between each other. As a result, the translation manager translates data to the destination computer's format while the document manager provides the storage retrieval and management framework for the documents and data.

The document management module also supports a central transaction container, essentially enabling the support of various automated data driven business processes. As a result, all information relevant to the transaction is stored in a central location.

The workflow servers 98 of FIG. 3 house the workflow manager module 110 of FIG. 4. The workflow manager module provides capability around task delegation, task statusing and task management for the system.

The system reporting functions are handled by the report manager module 117 and data manager module 119. The report manager module 117 of FIG. 4 is a standard technology used in the creation of reports and management information. Preferably, the report manager module is a wrapper around a business intelligence tool of Microstrategy, Inc. of Vienna, Va. The reports are primarily operational reports (volumes, client reports, revenue, etc.).

The data manager module 119 of FIG. 4 is a tool used in the construction of data marts and data warehouse solutions, such as electronic transaction wrappers, to allow for the reading and pulling of data from lenders, providers and diverse data sources into data repositories.

The spare server(s) 102 of FIG. 3 are used to replace any of the remaining application servers in the event that they need repair or maintenance.

In addition to illustrating the components of an embodiment of the system of the present invention, FIG. 4 describes the various typical lender systems that may be used along with the certifying company system and the associated order flow. As will be apparent from the following, some of the lender systems of FIG. 4 may be eliminated as their functions are performed by the certifying company system 63.

A lender initiates a request for the product of the present invention via a point of sale system 114 or a loan origination system 116. The point of sale system 114 provides for functionality to allow a lender's loan officer to manage leads, recommend loan products, provide loan comparison reports, initiate an initial loan application and generate borrower documents such as estimates. The loan origination system 116 allows the lender's loan processor and underwriter to perform due diligence on a loan to decide whether or not to provide the loan by ordering settlement service products and reviewing the loan file.

Lender systems 114 and 116 may interface directly with the application servers 93 of the system of the present invention via the Internet 84 and system web servers 92 (FIG. 3) or, alternatively, lender systems 114 and 116 may communicate with the application servers 93 via a third party decisioning platform 122 (FIG. 4). An example of a suitable vender decisioning platform in the SourceMaster product offered by the Dorado company of San Mateo, Calif.

The product decisioning system or platform 122 provides the lender with the ability to automatically decide the appropriate settlement service products required for a loan program and automatically or manually allow for the ordering and tracking of the settlement service products. The lender may optionally choose to use the platform 122 instead of having these tasks handled by the certifying company system. As with the decision manager 109, the decision rules used by the product decisioning platform 122 are set by the lender based on investor rules and loan program stipulations.

The point of sale system 114 and/or loan origination system 116 also communicate with a lender pricing engine 123 and a lender automated underwriting system 124. The lender pricing engine platform 123 typically calculates the interest rates for the loan based on several loan program characteristics received from the point of sale system 114 or loan origination system 116 including the loan period and loan type along with loan qualification criteria. The interest rates and supporting data are stored in the pricing engine platform 123 as well. The lender automated underwriting ("AU") platform 124 receives data from the lender systems 114 or 116 and provides an instant decision on whether a borrower or property will qualify for a loan program.

The vendor access network platform 125 provides connectivity between demand side Loan Origination Systems/Point of Sale applications to settlement service vendors. This lender system typically would be eliminated with the present invention as the certifying company system 63 would perform this function.

Figure 5:
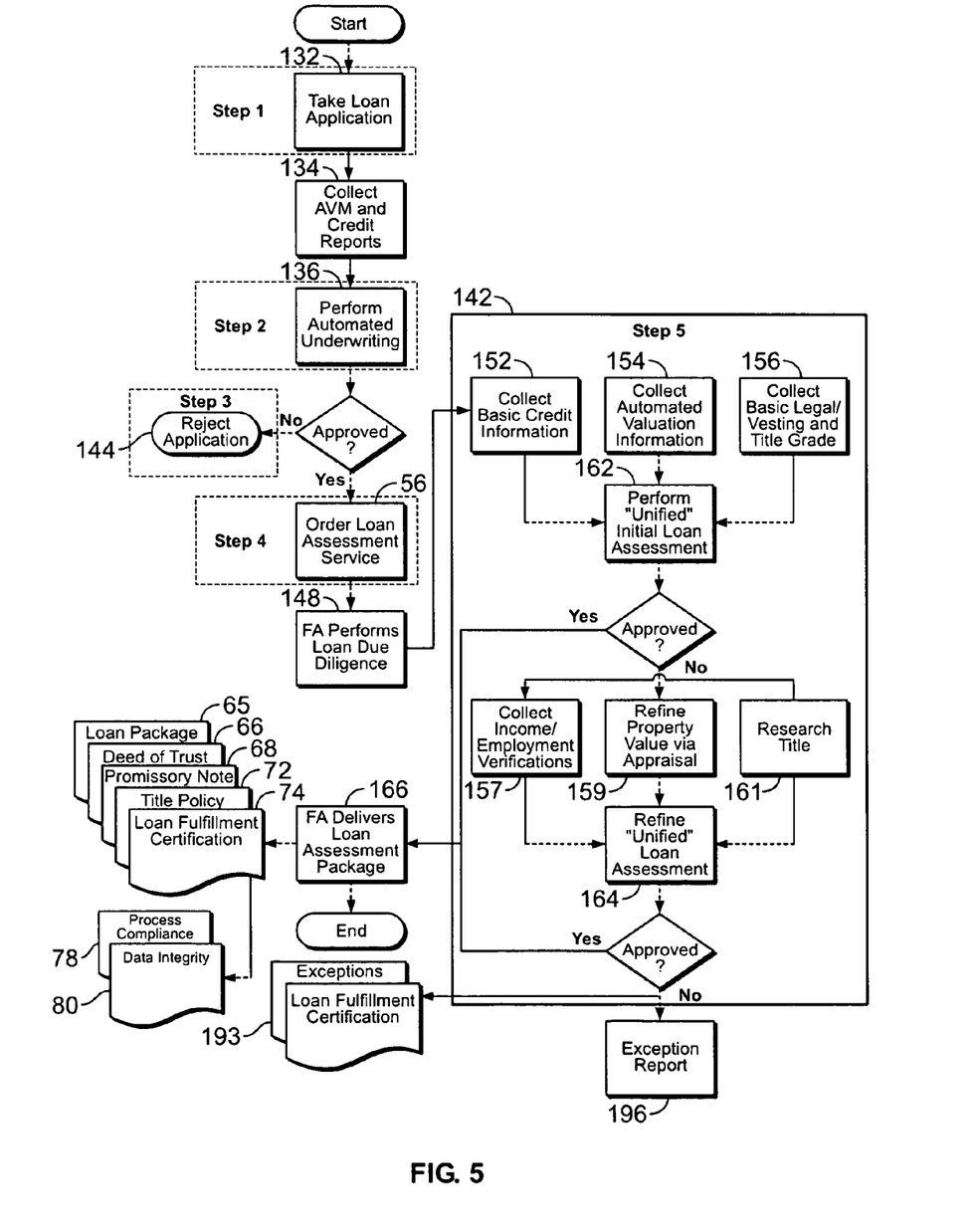
FIG. 5 is a flow chart illustrating a loan process performed by the systems and platforms of FIGS. 3 and 4 in accordance with an embodiment of the method of the present invention.

A loan process performed by the certifying company systems\ of FIGS. 2-4 in accordance with an embodiment of the method of the present invention is illustrated in FIG. 5. As indicated at block 132, the process starts with the collection of the loan application information by the mortgage lender. The information collected is entered by the lender into the lender point of sale system 114 of FIG. 4 or the loan origination system 116. The information collected includes the following:

Borrower(s) identification information (name, SSN, address)
Borrower(s) residency information
Borrower(s) employment/income information
Borrower(s) Assets and Liabilities
Purchase Property information (address, purchase price)
Loan information (Loan amount, loan program information)

While a transaction may involve separate collateral and purchase properties, the following discussion assumes that the purchase and collateral properties are one in the same and that the term "property" means this one property.

As illustrated at 134 in FIG. 5, during the next step of the process, the lender obtains reports regarding the borrower's credit and an Automated Valuation Models (AVMs) product directed to the value of the property. This is accomplished by the certifying company system connecting the lender systems 114 and/or 116 of FIG. 4 to outside service provider systems, or may optionally be performed by the product decisioning system or platform 122.

During the next step, illustrated at 136 in FIG. 5, the lender verifies that the application corresponding to the data entered in step 1 at 132 will qualify for the loan. This step is performed by an automated underwriting system (124 in FIG. 4) that reviews information collected from the loan application, credit reports and AVM to decide if the application qualifies. The lender point of sale system 114 (FIG. 4) or loan origination system 116 directly connects and transmits data to the lender's choice of automated underwriting system 124, typically proprietary.

If the application does not qualify, it is rejected, as illustrated at 144 in FIG. 5. A rejected application may be resubmitted with updated information for re-qualification.

As illustrated at 56 (see also FIG. 2), the lender submits the approved loan application and automated underwriting results for further processing via an embodiment of the system and method of the present invention. In order to do so, the lender systems 114 or 116 preferably access the certifying company's Internet web site through the Internet 84 and web servers 92 of FIG. 3. The lender then directly transmits the data from lender systems 114 or 116 through the Internet to the web servers 92 (FIG. 3) of the certifying company's system (or through product decisioning platform 122). All interactions with the certifying company's system are secured by the security & entitlement manager 112 to ensure that the user has appropriate privileges to perform the intended activity.

With reference to FIG. 4, the data entered or provided by the lender or other user of the certifying company's system travels via the portal manager module 104 of the portal server (94 in FIG. 3) to the transaction manager 106 of the core server (96 in FIG. 3) which parses the data into a transaction context and passes it to the data manager 119. The data manager receives the data, creates an electronic transaction wrapper and stores the data within the wrapper on the system databases (105 in FIG. 3).

As illustrated at 148, the certifying company system next takes the transaction wrapper and performs the loan due diligence 142. The due diligence process has two basic phases— an initial assessment followed with an optional rigorous assessment.

As illustrated at 152, 154 and 156 in FIG. 5, respectively, basic borrower credit information, automated value information for the property and basic legal/vesting and title grade information for the property is collected to perform a basic preliminary assessment 162. With reference to FIG. 4, in the preferred embodiment, the transaction manager 106 calls the routing manager 111 and the transaction data entered thus far is passed from the system database (105 in FIG. 3) via the routing manager 111 to external credit fulfillment platform 147, title fulfillment platform 149 and AVM platform 151 to order and obtain the data required for basic preliminary assessment 162. The transaction manager 106 uses the translation manager 113 to translate the XML transaction data from the certifying company system database into a format previously agreed upon with the service provider prior to transmitting the data file to the external system. All data collected is stored within the electronic transaction file. All data that needs to be stored in the database goes via the data manager component.

The data and products collected by the routing manager are stored on the certifying company system databases and are passed to the system decision manager 109 (FIG. 4) to perform assessment 162. During assessment 162, the data is reviewed as a whole package to assess the loan risk based on lender parameters. An example of a lender rule is that a borrower's credit score must be above 600 for loan qualification.

Figure 6:
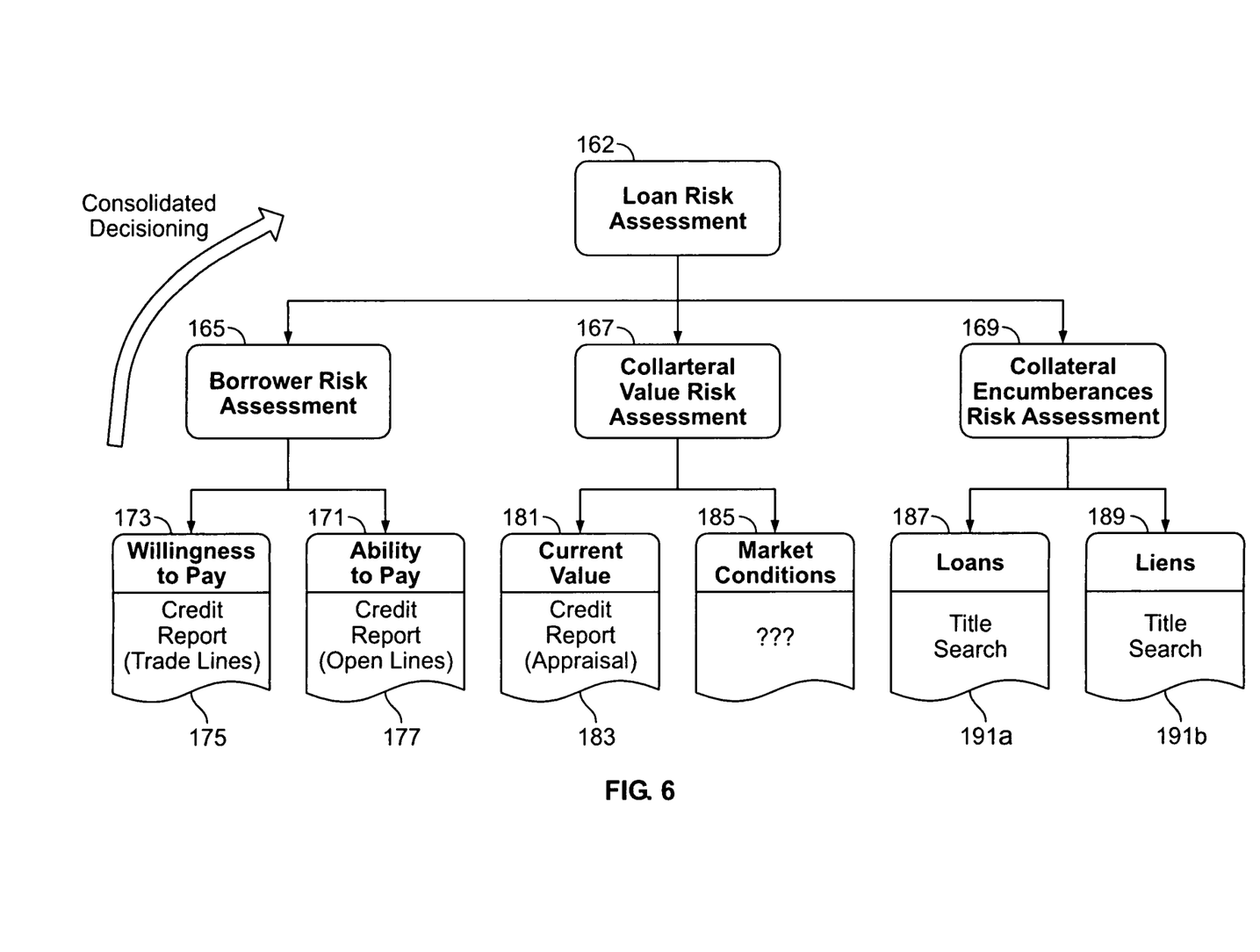
FIG. 6 is a tree diagram illustrating the loan risk assessment performed in the method of FIG. 5.

The elements of risk assessment across the collateral and borrower are illustrated in FIG. 6, which outlines the review and assessment process performed by the decision manager 109. The loan risk assessment 162 features three main risk elements that help evaluate the overall loan risk profile: borrower risk assessment 165, collateral value risk assessment 167 and collateral encumbrances risk assessment 169.

The borrower risk assessment 165 is based on a combination of the borrower's ability to pay 171 and the borrower's willingness to pay 173. The ability to pay is primarily derived from current income information versus debt which may be determined from trade lines credit reports 175 that were obtained from the credit fulfillment platform 147 (FIG. 4). The willingness to pay is derived among other things from previous payment history on debts held which may be determined from open lines credit reports 177, also received from the credit fulfillment platform 147 of FIG. 4.

The collateral value risk exposure 167 can be primarily attributed to the current appraised value of the collateral property 181 relative to the purchase price, which may be determined from an appraisal report 183. Appraisal report 183 was received from the automated valuation model platform 151 of FIG. 4. Collateral value risk is also a function of the economic conditions driving home prices 185. The automated valuation model platform 151 usually provides an estimate of the property value which the decision manager module 109 compares against the sales price to assess risk.

The collateral encumbrances risk assessment 169 reviews the ownership conflicts around the collateral property held as assurance against the debt. This assessment is an important component of the overall loan risk assessment. The assessment involves a review of the loans 187 and liens 189 on the property, both of which may be determined by a title search 191a and 191b performed by the title fulfillment platform 149 of FIG. 4.

A positive preliminary assessment 162 may result in approval, where the certifying company delivers the mortgage loan fulfillment product or loan assessment package (64 in FIG. 2) as illustrated at 166 in FIG. 5. Alternatively, the preliminary assessment 162 may refer the loan application for a more rigorous assessment 164.

During this second phase, that is, the more rigorous or refined assessment 164, further borrower due diligence may be performed via verification of income, employments, review of tax returns, etc. 157. In this phase, the property value may also be re-evaluated via a regular appraisal 159 for increased confidence in the quoted appraised value. Further, the property may be researched more for identifying potential title issues or investigating identified issues 161. This data is gathered by once again ordering products from external service provider platforms that communicate with the system through routing manager 111 of FIG. 4. This data is used by the decision manager 109 to perform the refined loan assessment 164 using the elements of risk assessment of FIG. 6.

The refined loan assessment 164 determines if the application is:

(i) Approved with no conditions, (ii) Approved with conditions or exceptions, or (iii) Rejected.

If the application is approved, then the appropriate certification is packaged along with the approval decision, as indicated at 166. If the loan application is approved with conditions or exceptions, then the appropriate certification is packaged along with the approval decision and a list of the exceptions and conditions 193. If the application is not approved, then an exception report is generated indicating the reasons for the dismissal 196. If the user is connected to the certifying company system via a direct interface, the package is delivered via that conduit by the routing manager. If the user uses the web user interface, then the package is delivered by the portal manager.

The mortgage loan fulfillment product 64, as illustrated in FIGS. 5 and 2, is accompanied with the following components:

Loan Package—illustrated at 65, all necessary data and/or documentation to enable the lender to deliver the loan to the secondary market.

Deed of Trust—illustrated at 66 in FIGS. 2 and 5, it is an instrument that is used in many states in place of a mortgage. Property is transferred to a trustee by the borrower in favor of the lender and reconveyed upon payment in full.

Promissory Note—illustrated at 68 in FIGS. 2 and 5, it is a promise in writing, and executed by the maker, to pay a specified amount during a limited time, or on demand, to a named person, or on order, or to bearer.

Title Insurance Policy—illustrated at 72 in FIGS. 2 and 5, it provides insurance against loss resulting from defects of title to a specifically described parcel of real property. Defects may run to the chain of title or encumbrances.

Loan Fulfillment Certification—illustrated at 74 in FIGS. 2 and 5, it is a letter of indemnity that in which the certifying company indemnifies the lender that the outsourced loan process was performed without errors, omissions or failures and in the event of error, omission or failure the certifying company will pay the lender an amount not to exceed the unpaid amount of the loan. As illustrated in FIGS. 2 and 5, the certification covers process compliance 78 and data integrity 80.

Figure 7:
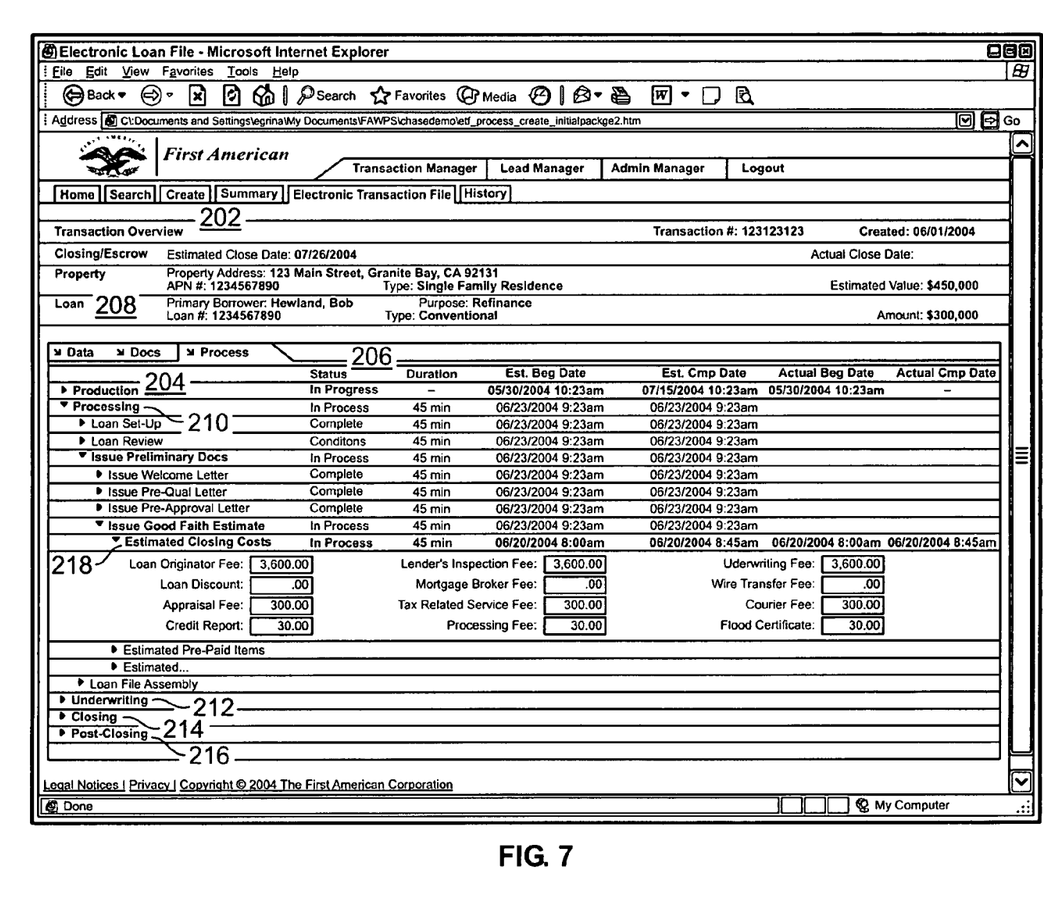
FIG. 7 shows a display screen in accordance with a preferred embodiment of the system and method of the invention that displays a complete view of a transaction to a lender or other system user.

FIG. 7 illustrates a display screen that may be accessed via the certifying company's Internet web site in accordance with a preferred embodiment of the system of the present invention. The display of FIG. 7 provides a complete view of a loan transaction to the lender or other customer accessing the system web servers via the Internet. The transaction overview 202 in FIG. 7 summarizes the transaction data. The transaction overview 202 shows, as indicated at 208, the estimated and actual close dates, the property address, APN number, type and estimated value and loan information including borrower name, loan number, purpose, loan type and amount.

On the remaining portion of the screen 206, the phases of the loan production stage 204 are presented. More specifically, the phases are organized into tiers with the highest level categories being loan processing 210, underwriting 212, closing 214 and post-closing 216. The steps for each phase are presented in a tiered hierarchy, as demonstrated for the processing phase 210 in FIG. 7. The detailed data for each tier is obtained by clicking on the triangle icon to the left of the tier title. The information includes the status each step in the phase, the length of time each step will take and estimated and actual beginning and completion dates of each step. In addition, financial information may be presented, as illustrated at 218 for the estimated closing costs.

The present invention thus provides an overall loan certification based on lender rules that cover data related to the collateral and borrower. In addition, the present invention provides consolidated ordering in that ordering is centered around the loan certification product. More specifically, products or data that are required to provide the certification are internal to the system and method of the present invention and are not externalized. As a result, there is no separate ordering of products. The present invention also provides consolidated decisioning in that the risk/certification decisions leverage the collective data across collateral and borrower. The decisions are more reliable than decisions made independently in that the borrower's ability to repay the loan and the collateral are evaluated together. The system and method of the present invention also pushes quality control checks as close to the point of data creation as possible. This helps mitigate downstream data management and loan deficiency resolution.

While the preferred embodiments of the invention have been shown and described, it will be apparent to those skilled in the art that changes and modifications may be made therein without departing from the spirit of the invention, the scope of which is defined by the appended claims.

What is claimed is:

1. A certifying company computer system for processing a mortgage loan and delivering mortgage loan documents, the system comprising:
   a. one or more portal servers having a portal manager module through which a lender enters data into the certifying company computer system, the data including borrower information, property information, and loan requirements;
   b. one or more database servers having a database that stores the entered data;
   c. one or more core servers that interface with one or more portal servers and the one or more database servers, the one or more core servers having a routing manager module, wherein the routing manager module passes the entered data to outside service provider systems and obtains product from the outside service provider systems, said products being stored on the database when received by the routing manager module;
   d. the one or more core servers further having a decision manager module in communication with the database, wherein the decision manager module performs an initial loan assessment using the entered data, the products, and decision making rules created by the lender;
      wherein said certifying company computer system delivers to the lender as an output a mortgage loan fulfillment product when the initial loan assessment is favorable, the mortgage loan fulfillment product including:
      a. a deed of trust;
      b. promissory note;
      c. title insurance policy; and
      d. a loan fulfillment certification of compliance for an assessment process performed by the certifying company computer system and integrity of the data used by the certifying company computer system in performing the assessment;
   e. the one or more core servers further having a workflow manager module in communication with the portal server and the core server, said workflow manager module providing task delegation, status and management.

2. The system of claim 1 wherein the initial loan assessment is based a borrower risk assessment, a collateral property risk assessment and a collateral encumbrances risk assessment.

3. The system of claim 1 wherein the decision manager module performs a refined loan assessment following the initial loan assessment.

4. The system of claim 3 wherein the refined loan assessment includes verification of borrower income and employment, evaluation of property value and researching property title.

5. The system of claim 1 further comprising web servers that communicate with the portal manager module and the Internet so that the borrower, property and loan data may be entered via a web page display screen.

6. The system of claim 5 wherein loan transaction information from the database and portal manager module is also displayed on the web page display screen.

7. The system of claim 5 further comprising a security and entitlement manager module that communicates with the portal manager module to restrict access to the system via the Internet.

8. The system of claim 1 wherein the one or more core servers further comprise a transaction manager module in communication with the portal manager module and a data manager module in communication with the transaction manager module and the database, said transaction manager module receiving data from the portal manager module, parsing it and passing it to the data manager module which creates an electronic wrapper containing the data and stores it on the database.

9. The system of claim 1 wherein the outside service provider systems provide credit fulfillment, title fulfillment and Automated Valuation Model products.

10. A certifying company computer system for processing a mortgage loan and delivering mortgage loan documents, the system comprising:
   a. one or more portal servers having a portal manager module through which a lender enters data into the certifying company computer system, the data including borrower information, property information, and loan requirements;
   b. one or more database servers having a database that stores the entered data;
   c. one or more core servers that interface with one or more portal servers and the one or more database servers, the one or more core servers having a routing manager module, wherein the routing manager module passes the entered data to outside service provider systems and obtains credit fulfillment products, title fulfillment products, and Automated Valuation Model products from the outside service provider systems, said products being stored on the database when received by the routing manager module;
   d. the one or more core servers further having a decision manager module in communication with the database wherein the decision manager module performs an initial loan assessment using the entered data, the products, and decision making rules created by the lender;
      wherein said certifying company computer system delivers to the lender as an output a mortgage loan fulfillment product when the initial loan assessment is favorable, the mortgage loan fulfillment product including:
      a deed of trust;
      b. promissory note;
      c. title insurance policy; and d. a loan fulfillment certification of compliance for an assessment process performed by the certifying company computer system and integrity of the data used by the certifying company computer system in performing the assessment;
e. the one or more core servers further having a workflow manager module in communication with the portal server and the core server, said workflow manager module providing task delegation, status and management.

* * * * *